US007389919B2

(12) United States Patent
Walker et al.

(10) Patent No.: US 7,389,919 B2
(45) Date of Patent: Jun. 24, 2008

(54) PRODUCTS AND PROCESSES FOR PROMOTING MULTIPLE TRANSACTIONS AT A RETAIL ESTABLISHMENT

(75) Inventors: Jay S. Walker, Ridgefield, CT (US); Jonathan Otto, White Plains, NY (US); Daniel E. Tedesco, Huntington, CT (US)

(73) Assignee: Walker Digital, LLC, Stamford, CT (US)

( * ) Notice: Subject to any disclaimer, the term of this patent is extended or adjusted under 35 U.S.C. 154(b) by 111 days.

(21) Appl. No.: 10/968,282

(22) Filed: Oct. 18, 2004

(65) Prior Publication Data

US 2005/0098625 A1 May 12, 2005

Related U.S. Application Data

(60) Provisional application No. 60/511,899, filed on Oct. 16, 2003.

(51) Int. Cl.
*G06K 5/00* (2006.01)
*G06K 15/00* (2006.01)
*G06F 7/08* (2006.01)
*G06F 17/00* (2006.01)
*G06Q 30/00* (2006.01)
*G07G 1/14* (2006.01)

(52) U.S. Cl. ............... 235/383; 235/380; 235/381; 700/234; 705/14; 705/15

(58) Field of Classification Search ............... 235/381, 235/375, 380, 462.01, 383; 705/40, 14, 26, 705/15; 463/16, 40, 17; 221/11; 700/234
See application file for complete search history.

(56) References Cited

U.S. PATENT DOCUMENTS 3,870,135 A * 3/1975 Allen .................... 194/205
4,199,100 A * 4/1980 Wostl et al. ................. 235/381
4,480,764 A * 11/1984 Takagi et al. ................. 221/11
4,858,743 A * 8/1989 Paraskevakos et al. ...... 194/205
5,772,510 A * 6/1998 Roberts ...................... 463/17
5,902,984 A * 5/1999 Planke ....................... 235/381
6,021,362 A * 2/2000 Maggard et al. ............ 235/383
6,042,149 A * 3/2000 Roshkoff .................... 283/67
6,044,952 A 4/2000 Haggerty et al. ............ 194/207

(Continued)

FOREIGN PATENT DOCUMENTS

WO    WO 97/28510    8/1997

OTHER PUBLICATIONS

"Vending Machines Redeem New Discount Coupons Coupons and Cash", PR Newswire, Aug. 5, 1991, Section: Financial News.

(Continued)

*Primary Examiner*—Uyen-Chau N. Le
*Assistant Examiner*—Thien T Mai

(57) ABSTRACT

Systems, methods, and articles of manufacture for promoting multiple transactions at a retail establishment are provided. According to an aspect of the invention, products and processes are disclosed for receiving, via a point-of-sale terminal that is not a vending machine, an indication of a set of products which a customer desires to purchase. At least one product is offered to the customer via the point-of-sale terminal, and an acceptance of the offer is received. Thereafter a request to receive the product is received. A unit of the product is dispensed via the vending machine.

8 Claims, 2 Drawing Sheets

U.S. PATENT DOCUMENTS

| | | | | |
|---|---|---|---|---|
| 6,116,505 | A * | 9/2000 | Withrow | 235/381 |
| 6,119,099 | A * | 9/2000 | Walker et al. | 705/14 |
| 6,131,399 | A * | 10/2000 | Hall | 62/127 |
| 6,193,154 | B1 * | 2/2001 | Phillips et al. | 235/381 |
| 6,574,603 | B1 * | 6/2003 | Dickson et al. | 705/1 |
| 6,845,907 | B1 * | 1/2005 | Enright | 235/381 |
| 6,905,411 | B2 * | 6/2005 | Nguyen et al. | 463/25 |
| 6,971,521 | B2 * | 12/2005 | Pinyot | 206/503 |
| 2001/0020198 | A1 * | 9/2001 | Wilson | 235/381 |
| 2003/0029557 | A1 * | 2/2003 | Hwang | 156/252 |
| 2003/0030211 | A1 * | 2/2003 | Brown | 273/139 |
| 2003/0125836 | A1 * | 7/2003 | Chirnomas | 700/236 |
| 2003/0163407 | A1 * | 8/2003 | Scott | 705/37 |
| 2004/0103033 | A1 * | 5/2004 | Reade et al. | 705/16 |
| 2004/0133466 | A1 * | 7/2004 | Redmond et al. | 705/14 |
| 2004/0162633 | A1 * | 8/2004 | Kraft et al. | 700/234 |
| 2004/0254837 | A1 * | 12/2004 | Roshkoff | 705/14 |
| 2005/0108158 | A1 * | 5/2005 | Prisant | 705/40 |
| 2005/0139649 | A1 * | 6/2005 | Metcalf et al. | 235/375 |
| 2005/0165637 | A1 * | 7/2005 | Meyerhofer | 705/14 |
| 2005/0192906 | A1 * | 9/2005 | Berstis | 705/59 |

OTHER PUBLICATIONS

Postman, Lore, "N.C.-Based Canteen to Sell Brand-Name Burgers in Vending Machines", The Charlotte Observer, Jun. 18, 1998.
Frazier, Eric, "McDonald's, Other Companies Accused of Misleading Backers", The Charlotte Observer, May 3, 2002.
Website: "Coin-Ops On Location", (http //www wordmarque com/location/col_opening html), download date: Aug. 19, 2003.
Website: "Coinco News—The Coupon Craze", (http //www coinco com/coin/news/couponcraze asp), download date: Apr. 6, 2004.

* cited by examiner

| VOUCHER IDENTIFIER | PERMITTED PRODUCT(S) | REDEEMED? |
|---|---|---|
| 11111 | 001, 009 | YES |
| 22222 | 008 | NO |
| 33333 | 007, 010 | NO |

FIG. 4

| VOUCHER IDENTIFIER | PERMITTED PRODUCT(S) |
|---|---|
| 11111 | 001, 009 |
| 22222 | 008 |
| 33333 | 007, 010 |

FIG. 5

PRODUCTS AND PROCESSES FOR PROMOTING MULTIPLE TRANSACTIONS AT A RETAIL ESTABLISHMENT

The present application claims the benefit of priority of the following U.S. Provisional Patent Application, which is incorporated herein by reference:

U.S. Provisional Patent Application No. 60/511,899 entitled "SYSTEM AND METHOD FOR VENDING MACHINE PROMOTIONS AT RETAIL ESTABLISHMENTS", filed Oct. 16, 2003.

BACKGROUND

At retail establishments, such as quick service restaurants (QSRs), many customers do not purchase as many products as they might otherwise desire to purchase due to many factors. For example, many customers defer the purchase of an item for various reasons, only to fail to make that secondary purchase. For example, a customer may fail to purchase a dessert, or defer the purchase of a dessert, when purchasing a meal. This may be because, e.g., the customer (i) is unsure how hungry he will be after his meal, (ii) is unsure of the dessert he desires, (iii) is unsatisfied with the limited selection of dessert product available, (iv) is unwilling to appear gluttonous and/or (v) desires the item "to go" after he has consumed his meal at the restaurant.

After a meal, the customer may fail to purchase another item (e.g., a dessert) because the customer (i) does not want to wait in line again, and/or (ii) has forgotten to do so.

BRIEF DESCRIPTION OF THE DRAWINGS

FIG. 4 illustrates an embodiment of a collection of stored data representing a voucher database.

FIG. 5 illustrates another embodiment of a collection of stored data representing a voucher database.

DETAILED DESCRIPTION

Figure 1:
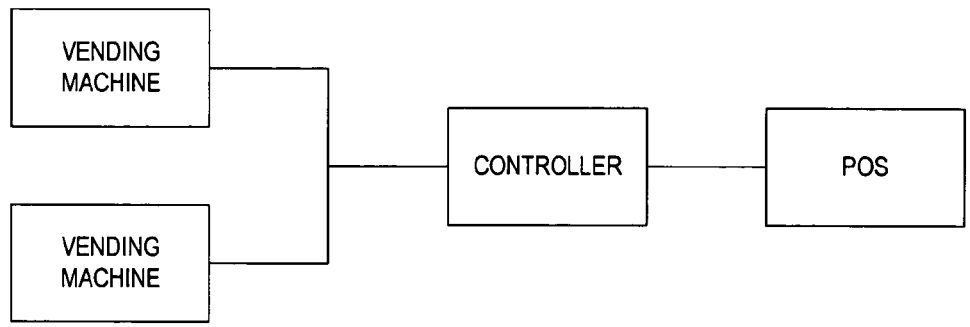
FIG. 1 is a block diagram of an embodiment of a system including a controller in communication with a POS terminal and with a plurality of vending machines.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limiting sense.

Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

1. Overview of Example Embodiments

According to some embodiments of the present invention, at a retail establishment (e.g. a QSR), a POS system can facilitate the sale of a secondary product (e.g. a dessert) that the customer can pay for, select, earn and/or redeem at one or more vending machines located within the retail establishment (and thus do so after ordering, e.g., a meal from a POS terminal). Thus, one or more vending machines on the premises of a retail establishment can serve as the delivery/fulfillment mechanism for promotions made at a POS such as an offer for an "upsell", and the like. The point of sale (POS) terminal, although different than a vending machine, can cooperate with the vending machine to the advantage of the customer, QSR and/or vending machine operator.

For example, according to a first embodiment, an indication of a set of products which a customer desires to purchase may be received via a POS terminal. The set of (one or more) products comprising the customer's order (e.g., two hamburgers and three small fries) may be entered by a cashier via a keypad on the POS terminal.

At least one product is offered, via the point-of-sale terminal, to the customer, such as verbally by the cashier and/or via a video display. An acceptance of the offer is received (e.g., by the cashier actuating a predetermined button on the POS terminal).

Afterwards, typically after the customer has finished eating his order, a request to receive the product is received via a vending machine. The vending machine is not the POS terminal, but may be located proximate to the POS terminal. A unit of the product is dispensed via the vending machine.

The above first embodiment is merely exemplary. Many more embodiments are explicitly described in detail herein, and many more are readily apparent to one of ordinary skill in the art based upon the present disclosure.

In one embodiment, a customer accepts an offer to purchase a secondary product, selects the secondary product, and pays for the secondary product at the POS terminal. For example, a customer may be provided with an upsell offer for a Snicker's® bar at the POS terminal, accept the offer and pay for the Snicker's® bar. The customer may then receive something which enables subsequent redemption (e.g., a voucher, the receipt for the order).

Subsequently (e.g. after eating a meal), the customer may redeem the selected secondary product at a vending machine. For example, after he eats his meal, a customer may present his receipt to the vending machine to receive a Snicker's® bar. In some embodiments, the vending machine may be instructed (e.g., by the POS terminal via a network) to reserve at least one unit (or any desired number of units) of the selected product for a fixed period of time (e.g. for 45 minutes after the offer has been accepted, until the end of the day).

In another embodiment, a customer accepts an offer to purchase a secondary product at the POS terminal and pays for the secondary product at the POS terminal. Subsequently (e.g. after eating a meal), the customer selects the particular secondary product and receives the secondary product at a vending machine. For example, a customer may purchase, via the POS terminal, a "dessert voucher" which is redeemable for any one of a plurality of desserts available for dispensing by a vending machine. In one embodiment the customer inserts the dessert voucher into a receiving opening in the vending machine, and selects a particular dessert from the vending machine.

In yet another embodiment, a customer receives a secondary product offer at the POS (e.g. an offer to buy a dessert for a discount price), but subsequently selects, pays for and picks up the secondary product at a vending machine. For example, a POS terminal may print a coupon good for 25% off any vending machine product.

Various configurations are possible, according to several embodiments. For example, referring to FIG. 1, a system includes a controller in communication with one or more POS terminal and with one or more vending machines. Thus, in this embodiment the controller (e.g., a networked computer, a server) can communicate with both the POS terminal(s) and with the vending machine(s). The controller thus can allow the vending machine(s) and POS terminal(s) to exchange information as desired.

Figure 2:
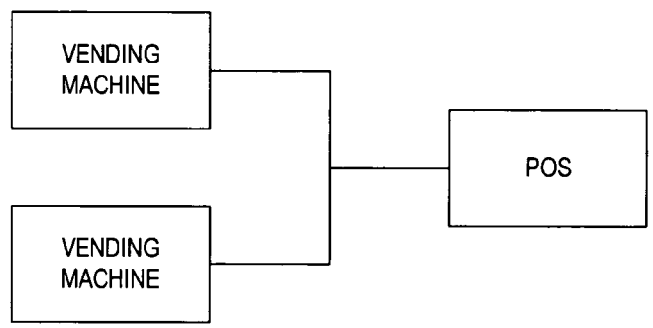
FIG. 2 is a block diagram of an embodiment of a system including a POS terminal in communication with a plurality of vending machines.

FIG. 2 represents another embodiment in which one or more POS terminals are in communication with one or more vending machines without an intervening controller.

Figure 3:
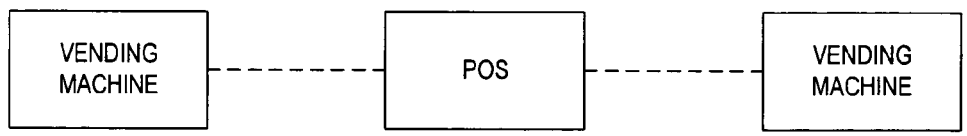
FIG. 3 is a block diagram of an embodiment of a system including a POS terminal which does not directly communicate with a plurality of vending machines.

In the embodiments of FIGS. 1 and 2, a POS terminal can (directly or indirectly) transmit one or more voucher codes to one or more vending machines, or the vending machines may (directly or indirectly) query the POS terminals (or other devices such as data storage devices) to determine information regarding a voucher code. Nevertheless, such communication between the POS terminals and vending machines is optional. For example, FIG. 3 depicts an embodiment in which the vending machines and the POS terminal do not communicate with each other (as depicted by dashed lines in FIG. 3). In such an embodiment, any data described herein as being stored on the controller may instead be stored on one or more vending machines and/or POS terminals. Similarly, some of the functionality described herein as being performed by a vending machine may instead or in addition be performed by a controller or a POS terminal. Similarly, any data described as being stored in a memory of a vending machine may (alternatively or additionally) be stored in a memory of a controller.

In such an embodiment, even though the vending machines and the POS terminal do not communicate with each other, they may nevertheless employ common protocols (e.g., regarding the encoding of information in voucher codes, regarding the format of bar codes). Also, information from a vending machine (e.g., a set of voucher codes redeemed) and information from a POS terminal (e.g., a set of voucher codes provided) may be gathered independently and compared with each other (e.g., by an operator, by a manager).

Generally, it can be desirable for the vending machine(s) to be located proximate to the POS terminal(s). It can also be desirable for the vending machine(s) to be located in view of the POS terminal(s). Typically, the vending machine(s) is located in the same building as the POS terminal(s).

2. POS Terminals

In one embodiment of the invention, the POS terminals described herein may be of the type utilized at restaurants (e.g., at quick-service restaurants). The one or more POS terminals may comprise cash registers. One suitable device which a POS terminal may comprises is the IBM 4683 or IBM 4693, manufactured by International Business Machines®.

As is known in the art, point-of-sale terminals typically include a display capable of displaying, e.g., text messages intended to be read by a cashier operating the terminal. According to some embodiments of the present invention, a POS terminal may be operable to execute transactions at a drive-through and may be in communication with a remote ordering station (e.g., a drive-through menu board) either directly or indirectly (e.g., via a controller).

A typical POS terminal includes a processor which may be a conventional microprocessor such as one or more Intel® Pentium® or Centrino™ processors. The processor may be in communication with a data storage device, which may be constituted by one or more of semiconductor memory, a hard disk drive, or other conventional types of computer memory. The processor and the storage device may each be (i) located entirely within a single electronic device such as a cash register/terminal or other computing device; (ii) connected to each other by a remote communication medium such as a serial port, cable, telephone line or radio frequency transceiver or (iii) a combination thereof. For example, the POS terminal may include one or more computers or processors that are connected to a remote server computer for maintaining databases.

Also operatively connected to the processor can be one or more input devices which may include, for example, a key pad for transmitting input signals (e.g., signals indicative of items to be purchased) to the processor. The input devices may also include an optical bar code scanner for reading bar codes and transmitting signals indicative of the bar codes to the processor. Another type of input device that may be included in the POS terminal is a touch screen, which can be overlaid on a video display device such as a "flat panel" monitor.

The POS terminal can further include one or more output devices. The output devices may include, for example, a printer for generating sales receipts, coupons, vouchers and the like under the control of processor. The output devices may also include a character or image display for providing text and/or other messages to customers and to the operator of the POS terminal (e.g., a cashier). The output devices are typically in communication with, and are controlled by, the processor.

Also in communication with the processor can be a communication port through which the POS terminal may communicate, via a network, with other apparatus such as peripheral devices, a controller, a server (e.g., a Web server), vending machines or other POS terminals.

The storage device typically stores one or more programs. The program is provided at least in part in accordance with embodiments of the invention, and can control/direct the processor to carry out functions in accordance with the embodiments of the invention. The program may also include other program elements, such as an operating system and "device drivers" for allowing the processor to interface with peripheral devices such as the input devices, the output devices and the communication port. Appropriate device drivers and other necessary program elements are known to those of ordinary skill in the art.

The storage device may also store one or more application programs for carrying out conventional functions of a POS terminal. Other programs and data not directly related to the functions described herein may also be stored in storage device. The storage device may contain one or more databases, as described herein.

3. Controller

A controller may be in communication with one or more devices, such as one or more POS terminals and/or one or more vending machines.

As described in further detail herein, the controller (which may be an existing server that fulfills various known in-store POS or back office server duties) can be operable to manage and/or optimize the information exchanged between POS terminals and vending machines. For example, the controller for a restaurant may manage the dissemination (e.g., to one or more POS terminals) and display (e.g., at one or more menu/advertisement display devices) of price information for various menu items.

The controller may communicate with the POS terminal(s) and/or the vending machine(s) (i) directly, (ii) via a network such as a Local Area Network (LAN), (iii) via the Internet or (iv) via any other communication technology, as is well known in the art. Possible communications protocols that may be part of system include: Ethernet (or IEEE 802.3), SAP, ATP, Bluetooth™, and TCP/IP. Communication may be encrypted to ensure privacy and prevent fraud in any of a variety of ways well known in the art. The POS terminal(s) and the vending machine(s) can be adapted to communicate with the controller in a known manner, and any number of vending machines and POS terminals may be in communication with the controller.

Communication between the controller and the POS terminal(s) and vending machine(s) may be direct or indirect, such as over the Internet through a Web site maintained by a controller, by a remote server, or over an on-line data network including commercial on-line service providers, bulletin board systems and the like. In yet other embodiments, the POS terminal(s) and vending machine(s) may communicate with controller over radio frequency (RF) signals, cable television signals, satellite communication links, other wireless media and the like.

In some embodiments, a controller may facilitate the transmission of data between one or more vending machines and one or more operator computers so that human operators may remotely interact with vending machines and/or vending machine customers.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

4. Vending Machines

Generally, a vending machine may comprise a device, or communicate with a device (e.g., a server, a peripheral device, and/or a peripheral device server), configured to manage sales transactions with customers by, among other things, receiving payment from customers, controlling the pricing and/or distribution (dispensing) of goods and/or controlling entitlements to services.

As used herein, a product is a good or service sold by a vending machine. Examples of goods sold at vending machines include beverages (e.g. cans of soda; bottles of water or iced tea) and snacks (e.g. candy bars; bags of chips). Examples of services sold by vending machines include car washes, photography services and access to digital content (e.g. permitting the downloading of MP3 files or cellular telephone "ring tones" to a handheld device such as an iPod™ device or cellular telephone).

As is well known, an operator is used to denote an owner (or agent thereof) of a vending machine. In one or more embodiments, an operator is a "route driver" or other service person that services one or more vending machines by restocking vending machines, and/or removing or depositing currency in vending machines.

A vending machine may include a processor, such as one or more Intel® Pentium® or Centrino™ processors. The processor may include, or be coupled to, (i) one or more clocks or timers, and (ii) one or more communication ports through which the processor may communicate, in accordance with some embodiments, with other devices such as one or more peripherals, controllers and POS terminals. In one or more embodiments, a communication port may comprise a modem (e.g. a cellular modem or otherwise), a wireless transmitter and/or a transponder (e.g. an infrared transmitter/receiver, a radio transmitter/receiver).

The processor may also be in communication with a data storage device. The data storage device may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor and the storage device may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the vending machine may comprise one or more computers (or processors) that are connected to a remote server computer operative to maintain databases, where the data storage device is comprised of the combination of the remote server computer and the associated databases.

The data storage device stores a program for controlling the processor. The processor performs instructions of the program, and thereby can operate in accordance with one or more embodiments of the present invention, and particularly in accordance with the methods described in detail herein. An appropriate computer program can be developed using an object oriented language that allows the modeling of complex systems with modular objects to create abstractions that are representative of real world, physical objects and their inter-relationships. However, it would be understood by one of ordinary skill in the art that the embodiments of the invention as described herein can be implemented in many different ways using a wide range of programming techniques as well as general purpose hardware systems or dedicated controllers.

The program may be stored in a compressed, uncompiled and/or encrypted format. The program furthermore may include program elements that may be generally useful, such as an operating system, a database management system and device drivers for allowing the processor to interface with computer peripheral devices. Appropriate general purpose program elements are known to those skilled in the art, and need not be described in detail herein.

Further, the program is operative to execute a number of invention-specific, objects, modules and/or subroutines, as disclosed herein.

According to some embodiments of the present invention, the instructions of the program may be read into a main memory of the processor from another computer-readable medium, such from a ROM to a RAM. Execution of sequences of the instructions in the program can cause the processor to perform the process steps of one or more embodiments of the invention. In alternative embodiments, hard-wired circuitry or integrated circuits may be used in place of, or in combination with, software instructions for implementation of the process steps of one or more embodiments of the invention. Thus, embodiments of the present invention are not limited to any specific combination of hardware, firmware, and/or software.

A vending machine may comprise payment processing mechanism(s), which may comprise one or more mechanisms for receiving payment and dispensing change (e.g., a coin acceptor, a bill validator, a card reader, a magnetic stripe reader, a change dispenser).

In a manner known in the art, a magnetic stripe card reader may read data on the magnetic stripe of a credit or debit card, and it may cooperate with conventional point-of-sale credit card processing equipment to validate card-based purchases through a conventional transaction authorization network. Suitable card-based transaction processing systems and methods are available from USA Technologies, Inc., of Malvern, Pa.

The coin acceptor, bill validator and change dispenser may communicate with a currency storage apparatus (a "hopper") and may comprise conventional devices such as models AE-2400, MC5000, TRC200 by Mars, Inc. of West Chester, Pa., or CoinCo model 9300-L.

The coin acceptor and bill validator may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein for all purposes. The change dispenser activates the return of coinage to the customer where appropriate.

In another embodiment, a vending machine in accordance with the present invention may be configured to receive payment authorization and product selection commands through a wireless device communication network, directly or indirectly, from a customer device (e.g. a cellular telephone). In such an embodiment, a payment processing mechanism may comprise a cellular transceiver operatively connected to a processor, as described herein. Systems and methods allowing for the selection of and payment for vending machine products through cellular telephones are provided by USA Technologies, Inc. Further, in such an embodiment, a customer cellular telephone may serve as an input/output device, as described herein.

Further details concerning vending machine payment processing mechanisms are well known in the art.

A vending machine may further comprise an output device and an input device. Any number of output devices and/or input devices may be included in the vending machine.

In accordance with embodiments of the presenting invention, a vending machine may include an input device for receiving input from a customer, operator, or other person. Also, a vending machine may include one or more output devices for outputting product and/or other information to a customer or operator.

Many combinations of input and output devices may be employed in accordance with embodiments of the present invention. For example, in embodiments which feature touch screens (described herein), input and output functionality may be provided by a single device.

As described, a vending machine may include more than one input device. For example, a vending machine may include an exterior input device for receiving customer input and an interior input device for receiving operator input. In some embodiments, however, the input device provides the dual functionality of receiving input data from both operators and customers.

As also described, a vending machine may comprise more than one output device. For example, a vending machine may include both an Liquid Crystal Display (LCD) screen and several Light Emitting Diodes (LEDs).

An output device may comprise, for example, an LCD and/or one or more LEDs displays (e.g., several alphanumeric LEDs on the shelves of a vending machine, each LED being associated with a row of product inventory).

In one embodiment, an LED display screen may be mounted to a vending machine (e.g., attached thereto, such as via bolts or other mounting hardware). Such a mounted LED display screen and may be used to communicate messages (described herein) to customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green).

Further, in some embodiments, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. raging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly. Speakers may comprise conventional speakers or modern hypersonic speakers.

An input device may comprise one or more of (1) a set of alpha-numeric keys for providing input to the vending machine, such as the Programmable Master Menu® Keypad, (2) a selector dial, (3) a set of buttons associated with a respective set of item dispensers, (4) a motion sensor, (5) a barcode reader, (6) a Dual-Tone Multi-Frequency (DTMF) receiver/decoder, (7) a wireless device (e.g. a cellular telephone or wireless Personal Digital Assistant), (8) cameras, such as digital video and/or digital still photographic cameras, (9) a voice recognition module, (10) a fingerprint reader, (11) a topical facial pattern scanner/reader, (12) an iris or retinal scanner, (13) a microphone, (14) an infrared receiver, and/or (15) any other device capable of receiving a command from a user and transmitting the command to a processor.

As described, in some embodiments, a touch-sensitive screen may be employed to perform both input and output functions. Suitable, commercially available touch screens for use in accordance with the present invention are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use in accordance with embodiments of the present invention may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art.

A vending machine may further comprise one or more inventory storage and dispensing mechanism(s). Product inventory storage and product dispensing functions of a vending machine configured in accordance with a snack machine embodiment of the present invention may include one or more of: (i) a drive motor, (ii) metal shelves, (iii) a product delivery system (e.g. a chute, product tray, product tray door, etc.), (iv) dual spiral (i.e. double helix) item dispensing rods, (v) convertible (i.e. extendable) shelves, and/or (vi) a refrigeration unit.

In some embodiments, a vending machine may be housed in a casing of the model 129 SnackShop manufactured by Automatic Products™. In such embodiments, three removable shelves may be employed, together providing for thirty product rows and an inventory capacity of between 185 and 522 commonly vended snack products.

Inventory storage and dispensing mechanism(s) may comprise one or more of: (i) metal and/or plastic shelving, (ii) item dispensing actuators/motors, (iii) product delivery chutes, and/or (iv) a refrigeration unit. Further details concerning vending machine inventory storage and dispensing mechanisms are well known in the art.

A vending machine may include or be in communication with a peripheral device. A peripheral device may be a device that obtains (e.g., receives or reads) information from (and/or transmits information to) one or more vending machines. For example, a peripheral device may be operable to obtain information about transactions being conducted at a vending machine, such as the initiation of a transaction, an amount of money deposited for a transaction and/or a product selected during a transaction. For example, a peripheral device may monitor activities carried out by a processor of a vending machine.

An example of a peripheral device is the e-Port™ by USA Technologies Inc. The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., promotions and information about their transaction status.

A peripheral device may be operable to receive input from customers, receive payment from customers, display messages to customers and/or exchange information with devices, such as a controller, a POS terminal, another vending machine. A peripheral device may be operable to instruct a vending machine that appropriate payment has been received (e.g., via a credit card read by the separate device) and/or that a particular product should be dispensed by the vending machine. Further, a peripheral device may be operable to instruct the vending machine to execute process steps and/or output messages.

The functions described herein as being performed by a peripheral device controller and/or a peripheral device may, in one or more embodiments, be performed by the controller (in lieu of or in conjunction with being performed by a peripheral device controller and/or a peripheral device).

In one or more embodiments, a peripheral device may be useful for implementing the embodiments of the present invention into the operation of a conventional vending machine. For example, in order to avoid or minimize the necessity of modifying or replacing a program already stored in a memory of a conventional vending machine, an external or internal module that comprises a peripheral device may be inserted in or associated with the vending machine. For example, a conventional vending machine may be retrofitted with a peripheral device in order to implement one or more embodiments of the present invention.

A peripheral device may include (i) a communications port (e.g., for communicating with one or more vending machines, peripheral device controller, another peripheral device, and/or controller); (ii) a display (e.g., for graphics and/or text associated with a promotion), (iii) another output means (e.g., a speaker, light, or motion device to communicate with a customer), (iv) a benefit providing means (e.g., a printer and paper dispensing means), and/or (v) an input means.

In one or more embodiments, the peripheral device may direct a vending machine to perform certain functions. For example, a program stored in a memory of peripheral device may cause a processor of a vending machine to perform certain functions. For example, a program stored in a memory of peripheral device may cause a processor of a vending machine to dispense one or more products, dispense a monetary amount, refrain from dispensing a monetary amount, refrain from outputting a product, and/or communicate with another device.

Note that, in one or more embodiments, a vending machine and a peripheral device that is associated with the vending machine may not communicate with one another at all. In some embodiments, however, each may communicate with a computer or other device. For example, a vending machine may communicate with a controller and an associated peripheral device may communicate with a controller. For example, if both the vending machine and the peripheral device are in communication with a controller, each may obtain information associated with the other through the controller.

A vending machine may include a cabinet constructed from, for example, any combination of (1) commercial grade (e.g., sixteen-gauge) steel (e.g., for exterior panels and internal shelving), (2) transparent materials such as glass or Plexiglas (e.g., for product display window), (3) rubber (e.g., for waterproofing insulation), (4) plastic, (5) aluminum, and/or (6) any suitable material.

Many commercially available machine cabinets can be modified to work in accordance with the embodiments of the present invention. For example, in snack machine embodiments, a suitable machine casing may comprise the 129 SnackShop™ manufactured by Automatic Products International, Ltd.™ of Saint Paul, Minn., which stands at 72"/1829 mm wide, has a width of 38⅞"/988 mm, and a depth of 35"/889 mm. Other suitable snack machine casings include the A La Carte™ machine from Automatic Products™, and the GPL SnackVendor™ model # 159 from Crane Merchandising Systems/Crane Co.™ of Stamford, Conn.

In beverage machine embodiments, machine cabinets commercially available from Dixie Narco™, Inc. of Williston, S.C. may be employed. Beverage machine cabinets may comprise a "cooler" or "glass front" style front panel, featuring a transparent front panel (e.g. glass) enabling customers to see inventory for sale. Alternatively, beverage machine casings may comprise a "bubble front" style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co.™. Further details concerning the suitability of machine casing/cabinetry are well known in the art, and need not be described in further detail herein.

5. Processes

As described above, various embodiments generally allow a customer to place an order via a POS terminal, and subsequently redeem a product (e.g., dessert, a beverage) via a vending machine.

5A. POS Terminal

According to one embodiment, the POS terminal receives, in a conventional manner, an indication of a set of (one or more) products that a customer desires to purchase. Typically in response to receiving such a set of products (but possibly before such receiving), at least one product is offered to the customer via the point-of-sale terminal.

Many manners of determining a product to offer are known. For example, such manners are described in U.S. Pat. No. 6,119,099, and various references cite thereby. Other means for determining a product to offer include determining a product to offer based upon revenue management principles, profit management principles, and other advantageous methods, as described in commonly-owned, co-pending U.S. patent application Ser. No. 10/966,407, entitled "PRODUCTS AND PROCESSES FOR MANAGING THE PRICES OF VENDING MACHINE INVENTORY", filed on Oct. 15, 2004, the entirety of which is incorporated herein by reference.

The offered product may (but need not) comprise a food product (which includes a beverage product). It can be particularly advantageous to offer (for later receipt) a food product that has a relatively-high perishability. For example, products which include ice cream may be considered to have relatively-high perishability because ice cream can melt relatively quickly (e.g., during the period from the start of a meal to the time dessert is to be consumed). Products which are generally preferred hot (e.g., coffee, soup) may be considered to have relatively-high perishability because they can cool significantly. Other types of products, especially food products, may be considered to have relatively-high perishability because, after being assembled, they generally change in taste with the passage of time. For example, an assembled food product that includes both lettuce and hot food components will generally change in taste as the lettuce warms and wilts. As another example, an assembled food product that includes both a bread component and hot or moist food components will generally change in taste as the bread component moistens.

An acceptance of the offer is thereafter received. For example, the POS terminal may receive a signal indicating that the cashier or customer actuated an "offer accepted" button. In one embodiment, where two or more products (or pluralities of products, or types of products) are simultaneously offered, the POS terminal may receive a signal indicating that the cashier or customer actuated a button indicating a selected product.

Note that, as described in detailed herein, offer and/or acceptance are optional. Further, acceptance may occur at, e.g., the vending machine upon presentment of a redemption voucher. For example, the customer may be provided with a ticket which, if inserted at the vending machine, indicates acceptance of an offer.

An offered category of product may be, e.g., a dessert category, and such an offer may comprise a text message such as "WOULD YOU LIKE A DESSERT AFTER YOUR MEAL?", or "WHICH WOULD YOU LIKE AFTER YOUR MEAL—A HOT DESSERT OR A COLD DESSERT?". An offered plurality of products may be, e.g., a set of enumerated products (e.g., the following three items: an 8 oz. Bag of potato chips, an 8 oz. Bag of pretzels and a Snickers® candy bar).

Payment for the accepted product may be received via the POS terminal, along with or separate from payment for the original order. Alternatively, the payment for the accepted product (e.g., the product dispensed by the vending machine) may be received via the vending machine, at redemption.

In one embodiment, the vending machine is configured such that payment may only be rendered by a customer with redemption voucher. For example, the vending machine may be configured such that payment from a customer is not accepted unless the vending machine determines that the customer has a redemption voucher. For example, payment might only be accepted once a paper voucher is inserted into a bill reader and determined to be authentic. In another example, the vending machine may be configured such that unless the vending machine determines that the customer has a redemption voucher, payment inserted or rendered by a customer is returned to the customer (e.g., after a predetermined time period has elapsed, after a voucher is determined to be inauthentic.

In one embodiment, the vending machine is configured such that payment is not accepted. In such an embodiment, a product would only be dispensed, e.g., only upon the vending machine receiving a redemption voucher. In such an embodiment, payment such as currency and credit card payments might not be accepted at all at any time. For example, the vending machine can be configured to lack conventional payment processing mechanisms, such as a slot for inserting coins and a bill reader that accepts paper currency. Such an embodiment would, for example, prevent the vending machine from being used by people who had not acquired a redemption voucher (e.g., by entering into a transaction at the merchant's POS terminal). Thus, in such an embodiment the use of the vending machine need not be completely discretionary with the customer.

In one embodiment, the retail prices of the vending machine can be set to be relatively high for those who do not possess a redemption voucher. This can be advantageous in certain embodiments, such as embodiments where dilution of sales at the POS is a concern. For example, the price of a certain product dispensed from the vending machine can be set to be $1.00 for, e.g., currency payments by customers without a redemption vouchers. However, customers may be able to purchase a redemption voucher entitling them to that product for a payment of less than $1.00 (e.g., for a payment of $0.75). The payment by the customer with the redemption voucher might be (i) rendered at the POS terminal, (ii) rendered at the vending machine, or (iii) rendered in part at the POS terminal and in part at the vending machine.

Thus, the price charged for certain vending machine products (or similarly the vending machine products which are offered for a certain amount of payment) can be based on concerns such as (i) the likelihood of dilution in purchases at the POS terminal, (ii) the likelihood of dilution in purchases of particular products at the POS terminal, (iii) the likelihood of such dilutions at particular times, and (iv) the acceptability of offers for redemption vouchers based on the required payments for those redemption vouchers, In one embodiment, the customer is provided with a redemption voucher after accepting the offer for a product. In another embodiment, the customer need not accept or even receive an offer in order to be provided with a redemption voucher. For example, as described in further detail below, a customer may be provided (e.g., at the POS terminal) with a "game piece" which might (e.g., if the game piece renders a winning outcome) be subsequently employed as a redemption voucher (e.g., at a vending machine).

The redemption voucher can be provided via the POS terminal, or can be provided at the POS terminal. In one embodiment, the redemption voucher is generated by the POS terminal (e.g., printed) and provided to the customer (e.g., retrieved by the customer, handed to the customer by the cashier). In one embodiment, the redemption voucher is stored separately (e.g., in a bin, in a cash drawer), retrieved by the cashier and handed to the customer.

The redemption voucher may be in any of several forms. For example, the voucher can comprise a substrate (e.g., paper, card stock or like material; a receipt printed by the POS terminal, another receipt) upon which indicia are registered in any of a number of conventional manners.

The POS terminal or another device may print indicia upon the substrate. Alternatively, the POS terminal or another device may direct a printing device to print indicia upon a substrate. Suitable printing devices include those devices conventionally used to print receipts and the like, via known ink jet, dot matrix or laser printing methodologies. Such printing devices may be peripheral devices of a POS terminal (e.g., connected thereto by a USB 2.0 connection), or devices integrated with a POS terminal.

A bar code or alphanumeric code may be registered upon the substrate. In general, various types of machine-readable indicia may be registered upon the substrate in various conventional manners. Machine-readable indicia include characters of at least a predetermined font size, 2-D bar codes, 3-D bar codes, glyphs and the like.

The indicia that may be registered on the substrate are generally representative of information, such as a code which identifies that voucher, and/or the value or redemption features of the voucher. For example, each redemption voucher (or a subset thereof, such as each redemption voucher which is a printed substrate) may be identified by a unique number or alphanumeric character string.

Codes and unique identifiers may be generated in any of a number of known manners. For example, the POS terminal may select the code from a plurality of codes (e.g., from a stored table of unique, randomly-distributed ten-digit numbers). In one embodiment, the code may be randomly selected from a plurality of codes. For example, the code may be randomly selected from a set of one billion sequential numbers.

In addition to or instead of the POS terminal generating a code, another device (such as a controller) may generate the code and transmit the generated code to the POS terminal. In still another embodiment, the code may be generated by a device that is neither a POS terminal, nor a vending machine, nor a controller. Such a device may comprise, e.g., a computing device which generates codes and prints indicia representing those codes on a substrate (e.g., when a button thereon is actuated). Such a device need not be in communication with a POS terminal, a vending machine, or a controller. Such a device can be advantageous in various embodiments because it can provide the functionality of generating certain types of redemption vouchers without modifications to a POS terminal. The device could be, e.g., located adjacent to a POS terminal and operated by the cashier.

As described above, in various embodiments one or more devices generate data for a voucher, such as a code which (possibly uniquely) identifies the voucher, the value of the voucher and/or redemption features of the voucher. For example, generated data can comprise a unique identifier, and thus serve to uniquely identify the redemption voucher. Additionally or alternatively, generated data can define at least one product for which the redemption voucher may be redeemed. Additionally or alternatively, generated data can define a discount amount (e.g., $0.50 reduction in price, half price, price set to $0.25), either for any product in the vending machine, or for certain products in the vending machine.

The generated data which defines, e.g., the value and/or redemption features of the voucher can be associated with the redemption voucher in any of a number of conventional manners. For example, an indication of the generated data can be stored in association with an indication of the redemption voucher.

FIG. 4 illustrates such an embodiment through a collection of stored data representing a voucher database. The stored data represents a voucher, as identified by a unique voucher identifier stored in a "VOUCHER IDENTIFIER" field. For each voucher identifier, there is a corresponding set of permitted products for which that voucher may be redeemed. In the illustrated embodiment, the permitted products are indicated by a stored set of product identifiers in a "PERMITTED PRODUCT(S)" field. For each voucher identifier, there is also a corresponding indication (in a "REDEEMED?" field) of whether the voucher was redeemed.

Through the structure illustrated by FIG. 4, various information regarding the value and/or redemption features of the voucher can be associated with the corresponding redemption voucher. Thus, upon receiving an indication of, e.g., a voucher identifier, the voucher database can be searched for the record corresponding to that voucher identifier. The data stored by that record provides information regarding any characteristics of the voucher desirable to store.

The voucher database represented by FIG. 4 can also be used to, if desired, prevent the same voucher from being redeemed more than once. For example, if a duplicate of a voucher with machine-readable indicia is made (e.g., by photocopying), the duplicate can possess the same voucher identifier as the original. Nevertheless, by employing data regarding previous redemption of the voucher (e.g., through the data stored in the "REDEEMED?" field), a vending machine can determine whether a voucher should not be redeemed more than once, if desired.

In another embodiment, the vending machine need not determine whether a voucher has already been redeemed. Instead, the vending machine may merely store an indication of a second redemption (e.g., by adding another record to the voucher database, and permitting duplicate entries for identical voucher identifiers). Another entity (e.g., a controller) may subsequently determine (e.g., through a periodic auditing process) that a duplication has taken place (by determining the presence of records with the same voucher identifiers).

The data illustrated by FIG. 4 may be stored in a data storage medium of a POS terminal, a controller and/or a vending machine. In one embodiment, the data illustrated by FIG. 4 is stored by a controller, which can track both the issuance (e.g., by receiving data from a POS terminal) and redemption of vouchers (e.g., by receiving data from a vending machine).

In one embodiment, the redemption voucher can itself describe the various information regarding the value and/or redemption features of the voucher. In other words, it is not necessary to store the value and/or redemption features of a voucher in association with an indication (e.g., an identifier) of the redemption voucher. For example, data retrievable from the voucher may encode information (e.g., via a 2-D bar code, via other indicia) that is used, e.g., by the vending machine to determine redemption features.

In such an embodiment, the vending machine need not access a voucher database which describes, e.g., vouchers and corresponding redemption features. However, in an embodiment described immediately below, the vending machine may store data representing vouchers redeemed. FIG. 5 illustrates such a database.

FIG. 5 illustrates another embodiment of a collection of stored data representing a voucher database. In this embodiment, the vending machine can store, upon redemption, a voucher identifier of the redeemed voucher and (optionally) the corresponding features of the voucher. Thus, the very presence of voucher in such a voucher database indicates the redemption of that voucher.

Accordingly, whether a voucher with a particular voucher identifier has been redeemed is readily determinable by the vending machine; the vending machine can determine, for any voucher identifier, whether the voucher identifier exists in the voucher database.

If desired, the vending machine could thus employ such a voucher database to assure that, e.g., the same voucher cannot be redeemed more than once (e.g., if the voucher is photocopied). In a like manner, the voucher database depicted in FIG. 5 could be shared by a plurality of networked vending machines, and permit all vending machines to make like decisions regarding, e.g., whether a particular voucher has been redeemed at any of the vending machines.

This data stored by the vending machine can later be reconciled, e.g., with data regarding vouchers provided by the POS terminal. Such a practice can be advantageous, e.g., for auditing whether vouchers redeemed correspond to vouchers provided.

In another embodiment, providing the redemption voucher includes providing a token, such as a disk formed from, e.g., metal or plastic. Accordingly, a token may be provided to the customer (e.g., by a cashier, at a POS terminal) and the customer subsequently redeems the token at a vending machine.

Such tokens are well known and are conventionally received and processed by many types of vending machines. For example, a coin acceptor of the vending machine can be programmed to accept only tokens that fall within a range of tolerances for size, weight, density, magnetic properties and/or composition.

Different tokens can be used to denote different values. For example, a first type of token may have a value of $1.00, while a second type of token may have a value of $0.75. Thus, in such an embodiment the token used determines the price of the product which may be redeemed, or determines the amount of extra payment in addition to the token which is required to purchase a product from a vending machine.

Different tokens can be used to denote different categories of products for which the token may be redeemed (e.g., for no extra payment rendered at the vending machine). For example, a first type of token may have a category defining "cold dessert" products, while a second type of token may have a category defining "hot dessert" products. Thus, in such an embodiment the token used determines the set of one or more allowable or permitted products for which the token may be redeemed.

It can be advantageous that tokens having different values or redeemable for different things have different appearances, making discernment and discrimination by, e.g., a cashier or customer easier. For example, different tokens can be colored differently, or shaped differently to denote their different values (e.g., red tokens are worth $1.00, and blue tokens are redeemable for any dessert).

In one embodiment, the cashier and/or the customer may be informed of which token is appropriate. For example, based on the offered product that the customer accepted, a display device can display an indication of one of a plurality of tokens which can be redeemed for that product. Thus, the display device might indicate that a red token should be provided from a set of red, white and blue tokens. Such a display device may be a component of a POS terminal, in communication with a POS terminal, or entirely separate from the POS terminal.

A token can also be encoded to denote a value, category of products or other redemption features through the use of radio frequency identification (RFID) encoders, transmitters and receivers. For example, a token may include an RFID transmitter which is programmable to transmit a code that identifies, e.g., the set of products for which the token may be redeemed. An RFID programming module (e.g., in communication with the POS terminal) may be used to program an appropriate code into a particular token. That token may be provided for use as a redemption voucher. Upon redemption at a vending machine, an RFID receiver at or in communication with the vending machine can read the RFID code of the token, and therefrom determine, e.g., the set of products for which the token may be redeemed.

Various promotions may be displayed to the customer during the customer's meal via a variety of known mechanisms. For example, one or more display devices located, e.g., in the eating area, along the path to the eating area, may provide advertisements for products available from vending machines.

Such display devices may comprise television monitors, CRT monitors, flat panel monitors, or any other device capable of displaying text and/or images to a customer. The content shown by the display devices may be controlled by a controller, a POS terminal, and/or a vending machine. For example, a controller may determine (i) what redemption vouchers have been provided by POS terminals in the previous fifteen minutes, and (ii) what products may correspond to those vouchers. Based thereon, the controller may advertise certain products (e.g., those products in particular), rather than a general advertisement to visit the vending machine. In one embodiment, the advertisement includes an image of one or more products available from a vending machine.

In addition to or instead of display devices, advertising and promotions may be provided to customer via audio output devices (e.g., speakers) and/or olfactory output devices.

Such display devices and other output devices which allow promotions and advertising may be configured with input receivers such as RFID transceivers allowing the detection/identification of meal trays and/or products that are provided to the customer. Thus, dessert tags, receipts, meal trays and the like can be detected, and advertisements/promotions can be activated based on proximity to the customer and/or the customer's order. For example, if a customer purchased a chicken sandwich, those desserts that tend to be selected by customers who eat chicken sandwiches can be promoted.

5B. Vending Machine

As described above, a product offered via a POS terminal may be redeemed via a vending machine.

According to one embodiment, a vending machine receives from the customer a request to receive the product. In response, a unit of the product is dispensed via the vending machine.

If payment for the product is first required (e.g., the product was not paid for during the transaction at the POS terminal), then the vending machine may dispense only after payment for the product is received via the vending machine.

A redemption voucher may be received via the vending machine in a known manner. As also described above, the redemption voucher may be a substrate (e.g., paper) bearing machine-readable indicia, such as optically-readable indicia in the form of a bar code. As also described above, the redemption voucher may be a token which bears information (i) in the form of the characteristics of the token (e.g., size, weight, density) and/or (i) in other manners (e.g., RFID transmission). In another embodiment, the redemption voucher may be a machine-readable card (e.g., a card having a magnetic stripe encoded with information).

The received redemption voucher may be read to determine information born by the redemption voucher. Such read information may be used to determine, e.g., an amount of a discount of the voucher, at least one product for which the redemption voucher may be redeemed.

In an embodiment where the information read from the redemption voucher defines exactly one product for which the redemption voucher may be redeemed, the vending machine can then dispense that product. If payment for the product is first required (e.g., the product was not paid for during the transaction at the POS terminal), then the vending machine may dispense only after payment for the product is received via the vending machine.

In an embodiment where the information read from the redemption voucher defines a set of products for which the redemption voucher may be redeemed, the vending machine may await a customer selection of any of the set of products. For example, upon reading the redemption voucher, the vending machine may display a message "PLEASE CHOOSE ANY DESSERT". If the customer selects a product that is not included in the set of products, the customer may be so informed (e.g., via a message "THAT IS NOT A DESSERT, PLEASE CHOOSE ANY DESSERT").

In an embodiment where the information read from the redemption voucher defines an amount of a discount, the vending machine may credit that amount to the conventional "amount paid" setting of the vending machine, as is well known in the art. The customer could then, in a conventional manner, select a product, and if necessary, render additional payment for that product is the discount amount is insufficient.

In one embodiment, when the vending machine determines an amount of a discount, the vending machine can adjust, based on the amount of the discount, the prices of any or all products available via the vending machine. For example, if the read data defines a discount amount of $0.50, the vending machine can reduce the prices of all products (or of certain products) by $0.50.

The adjusted prices may be displayed in a known manner (e.g., by updating price displays adjacent to the corresponding products). Alternatively or additionally, a message may be displayed (e.g., "All prices are reduced by 50 cents"). Alternatively or additionally, another type of indication of a discount being in effect may be displayed (e.g., an LED may be illuminated).

In one embodiment, the customer may have been provided (e.g., at a POS terminal during a transaction) with a game piece or other indication of speculative value. The vending machine can thus serve as a prize fulfillment mechanism.

For example, the customer may be provided with a game piece which may be redeemed for a product at a vending machine only if the game piece has a "winning" outcome. Alternatively, the game piece may be redeemable for a product, but the nature of the product is not determined until, e.g., a game outcome is determined, the product is randomly selected and dispensed.

Such game pieces may assume any of a number of conventional forms, such as a card with a "scratch-off" or other alterable substrate. When the substrate is "scratched off" (or otherwise altered) a game outcome is revealed. The revelation might also indicate to the customer the nature of the winning (e.g., "YOU WON ANY DESSERT OF YOUR CHOICE", "YOU WON A $0.50 OFF ANY PRODUCT IN THE VENDING MACHINE"). The revelation might indicate some but not all of the characteristics of the winning e.g., ("YOU WON A RANDOM DESSERT—REDEEM NOW TO SEE WHAT IT IS").

Such game pieces can bear machine-readable indicia, as described above, thereby allowing the vending machine to determine the prize, set of possible prizes, and/or the game outcomes. In an embodiment where the vending machine determines the prize or set of possible prizes, the indicia may indicate, e.g., an amount of a discount, one or more product codes. The indicia may also or instead indicate an identifier (as in the voucher identifier described above) which is associated with one or more product codes or an amount of a discount.

In one embodiment, the vending machine determines the prize by determining the game outcome, and then determining the prize corresponding to that game outcome. For example, a barcode may represent the game outcome in a known manner, and the vending machine may retrieve or determine (based on predetermined game rules) the prizes (e.g., product codes) corresponding to that game outcome.

The game piece may be a pure game of chance, or may be based at least partially on skill. For example, a game piece (e.g., the customer's receipt) may include alterable areas which the customer completes for subsequent "scoring". In such an embodiment, the customer may be asked to, e.g., answer questions and indicate the answers by darkening check boxes or bubbles (e.g., with pencil shadings), or by other known means.

The customer can then present the game piece to a vending machine which, e.g., optically reads the areas darkened and scores the questions in a known manner by comparison to a set of stored answers. A prize can be based on the score in a variety of ways.

Similarly, a customer can be provided with a product at a vending machine (even if there was no offer for such a product) by the customer providing a vending machine with customer feedback data. Various methods of presenting feedback data to a vending machine are described in commonly owned, commonly-owned U.S. patent application Ser. No. 09/152,905, entitled "VENDING MACHINE METHOD AND APPARATUS FOR ENCOURAGING PARTICIPATION IN A MARKETING EFFORT", filed on Sep. 14, 1998, and issued as U.S. Pat. No. 6,161,059 on Dec. 12, 2000. In one embodiment, the customer may be advantageously provided with an enticing offer (e.g., a free product from a vending machine) in exchange for answering questions.

For example, a customer feedback card may include alterable areas which the customer completes for subsequent determination that, e.g., most or all question have been answered. In such an embodiment, the customer may be asked to, e.g., answer questions and indicate the answers by darkening check boxes or bubbles (e.g., with pencil shadings), or by other known means.

The customer can then present the customer feedback card to a vending machine which, e.g., optically reads the areas darkened and determines in a known manner whether sufficient number of questions have been answered. A product, discount or other benefit can be provided by the vending machine based on the read customer feedback in a variety of ways.

In another embodiment, customer feedback data may be entered via user input device, which may be a component of the vending machine or a device in communication with the vending machine. For example, in response to questions displayed on a display device (e.g., a component of the vending machine), a customer may manipulate a user input device (e.g., a numeric keypad, a touch screen) to provide answers to the questions.

In one embodiment, a customer can earn points in an account (e.g. an account linked to a "frequent shopper" card or other retailer card) in exchange for transactions made at a POS terminal. Thus, when a frequent shopper card is used in a transaction at a POS terminal, or when the customer is otherwise identified in a transaction at a POS terminal, points may be awarded to the customer (e.g., based on the price of products purchased, based upon the purchase of qualifying products, based on acceptance of offered products).

The points may be redeemable for products at a vending machine, or redeemable for discounts on products at a vending machine. Such redemption may be based on (i) the amount of points accumulated, and/or (ii) achieving at least a predetermined amount of points accumulated. The points may be, but need not, linearly translated to a discount amount (e.g., every thousand points is redeemable for a product worth $1.00).

As described above, a vending machine can serve as an efficient mechanism for delivering products. However, in another embodiment of the present invention, the customer may use the redemption voucher at other than a vending machine. For example, the redemption voucher may entitle the customer to, e.g., use an express lane of a POS terminal, to go to the start of the line at a POS terminal, access areas otherwise off-limits or of restricted access.

6. Examples of Various Embodiments

Immediately below are examples provided purely to illustrate certain embodiments of the present invention. These examples are not representative of all embodiments.

In this first example, while ordering a meal at a QSR, a customer accepts an offer for a dessert and pays for the dessert at a POS terminal. During the meal, multimedia devices market particular dessert selections to the customer. After eating his meal, the customer selects and receives dessert from a vending machine.

Specifically, in this first example, the customer enters the QSR and orders a hamburger and a medium soda from a cashier. The cashier enters this order into the POS terminal. The POS terminal prompts the clerk to offer the customer the ability to purchase any dessert in the store's several vending machines for 25% off, provided customer pays now.

The customer verbally accepts this offer, and the cashier in response depresses an "ACCEPT" button on a touch screen portion of the POS terminal. The customer pays cashier, and the cashier processes the transaction at POS terminal in a known manner. The POS terminal prints a receipt containing a barcode, and the receipt is handed by the cashier to the customer.

The customer takes his hamburger and medium soda to table and proceeds to eat his meal. During the meal, televisions throughout the dining areas of the QSR receive signals from the vending machines, which signals direct the televisions to output advertisement messages corresponding to those products in the vending machine's inventory that are approaching their expiration date. The customer views the advertisements, and reacts by approaching one of the vending machines with the intent of selecting one of the advertised products.

The customer feeds his receipt into a barcode reader attached to the vending machine. The vending machine determines whether the barcode on the printed receipt corresponds to a valid entry in a prepaid code database, which is stored either locally on the vending machine or remotely (e.g. at a server, a controller or a POS terminal).

The vending machine confirms validity of code. The customer is prompted by vending machine output device (e.g., a video display) to select a product. The customer selects the advertised product by depressing corresponding keys on the vending machine's keypad. The vending machine authorizes the dispensing of the selected product by activating corresponding item dispensing apparatus in a known manner.

In this second example, a customer is provided with an opportunity to play a game of skill during the meal, and then redeem the prize at a vending machine.

Specifically, in this second example, the customer enters the QSR and orders a meal. The cashier enters the customer's order into the POS terminal. The customer pays the cashier, and the cashier processes the transaction at the POS terminal in a known manner.

The POS terminal prints a receipt containing trivia questions. The customer takes his meal to a table and proceeds to answer the trivia questions by filling in machine-readable portions corresponding to answer choices on the receipt.

The customer approaches a vending machine and feeds the receipt into a media reader attached to the vending machine. The vending machine reads the filled in portions and determines that 75% of the trivia questions were answered correctly. Accordingly the vending machine outputs a message to the customer (via a video display) instructing the customer to select any item in the machine as a prize.

The customer selects a product by depressing corresponding keys on the vending machine's keypad. The vending machine authorizes dispensing of the selected product by activating the corresponding item dispensing apparatus in a known manner.

7. Advantages of Various Embodiments

The diverse embodiments disclosed herein can be utilized to provide one or more of a variety of advantages. Many advantages are described in co-pending U.S. Provisional Patent Application No. 60/511,899 entitled "SYSTEM AND METHOD FOR VENDING MACHINE PROMOTIONS AT RETAIL ESTABLISHMENTS", filed Oct. 16, 2003.

For example, there are shortcomings associated with the sale and purchase of "secondary" products, such as desserts, at retail establishments. Although dessert products can be profitable for a QSR, the opportunity to sell desserts often goes unrealized for several reasons. There are often not enough menu options for customers to select from. This is, at least in part, because of limited space behind the registers.

People often do not want to buy dessert at the same time when they are buying a meal. For example, customers may want to wait to see how full they will be after they eat the meal. That is, customers may be hesitant to buy dessert when they purchase a meal because they may believe that, after they eat, they might not be hungry for dessert. Even assuming that customers are sure that they do want dessert, they may not know which dessert option they might want to later enjoy at the time they are purchasing a meal. That is, customers might want to wait until they are done eating a meal before they decide what type of dessert they are "in the mood for." In a culture that increasingly focuses on weight control and image, customers may not want to appear or feel gluttonous by initially purchasing a larger quantity of food at the cash register.

Later, after a customer eats a meal, if he or she wants dessert, he or she might be deterred/discouraged from doing so if he or she must engage in another conventional retail transaction. Particularly, the customer may be discouraged by having to wait in line again. The customer may be discouraged by the prospect of again transacting with an untrained, unfriendly, poorly communicating and/or slow retail clerk. That is, if service fails to meet a customer's satisfaction level when a meal is purchased, it is highly unlikely that the customer will return to the counter to engage in an additional transaction (e.g. to purchase dessert).

Further, many retail establishments do not have a way to actively promote desserts and other items to customers during a meal.

Further, there does not exist a dynamic way to continuously communicate with customers about dessert selection while customers are enjoying meals. Rather, prior art dessert promotion techniques are limited. Static advertisements (e.g. posters with pictures of dessert options) do not allow for dynamic, customized messages throughout the meal. Moreover, at restaurants offering table service, waiters and waitresses may present dessert options to customers after customers have eaten their meals. However, this technique is inapplicable in QSR contexts where table service is not provided. Further, this technique fails to continuously promote/market/advertise dessert options throughout the meal—it doesn't create or increase demand during the meal.

Applicants have previously recognized that "upsells" and other point-of-sale (POS) promotions may increase the profitability of a given retail establishment by promoting the sale of retail products, including "secondary" products that supplement or complement other products selected by a customer. However, Applicants also recognize that some promotions may require customers to make a choice as to which product to select. For example, where an "upsell" offer presents the customer with the opportunity to select one of two products for a promotional price (e.g. either an apple pie or a cookie for $0.25), the customer must decide which of the two products to accept. Because customers may not have anticipated such an offer, they may not readily have a selection in mind when presented with such an offer, and may accordingly take some time to decide which product to choose (e.g. a mother may take a moment to ask her son which dessert option he wants). Such decision-making may hold up lines in retail establishments, which may not be desirable in some contexts (e.g. where increased transaction volume will lead to greater profitability).

Accordingly, in U.S. patent application Ser. No. 09/045,386, entitled METHOD AND APPARATUS FOR CONTROLLING THE PERFORMANCE OF A SUPPLEMENTARY PROCESS AT A POINT-OF-SALE TERMINAL, filed Mar. 20, 1998, the entirety of which is incorporated herein by reference, Applicants previously disclosed a system in which a POS terminal measures one or more criteria, such as the activity rate of the POS terminal. For example, the POS terminal may measure the number of completed transactions per time, the number of items purchased through the POS terminal per time, the number of upsells accepted by customers per time, the number of customers in a store or the number of customers in the vicinity of the POS terminal. The POS terminal in turn compares the measured criteria with a predetermined threshold. Based on the results of the comparison, the POS terminal determines whether to perform a supplementary process. For example, the POS terminal may perform the supplementary process only if the number of transactions per minute is less than a predetermined threshold.

Clearly, although U.S. patent application Ser. No. 09/045,386 provides on solution, the present application discloses alternative solutions that do not require merchants (e.g., QSRs) to cease making offers.

We claim:

1. A method comprising:

receiving, via a point-of-sale terminal that is not a vending machine, an indication of a set of food products which a customer desires to purchase;

offering, via a point-of-sale terminal, at least one food product to the customer; receiving, via the point-of-sale terminal, an acceptance of the offer;

receiving payment for the product;

generating data which defines at least one food product;

generating a voucher identifier;

associating the generated data with the voucher identifier;

printing on a paper substrate indicia that represents at least one of the generated data and the voucher identifier; providing the paper substrate to the customer;

receiving, from the customer, the paper substrate via a vending machine that is not the point-of-sale terminal, but that is located proximate to the point-of-sale terminal; in which the step of receiving the paper substrate is performed after the step of receiving the acceptance of the offer; determining, from the paper substrate, the data which defines the at least one food product;

receiving, by the vending machine and from the customer, a selection of a food product; comparing the selected food product with the at least one food product defined by the data; and dispensing, via the vending machine, the unit of the selected food product.

2. A method, comprising:

receiving, via a point-of-sale terminal that is not a vending machine, an indication of a set of products that a customer desires to purchase;

offering, via the point-of-sale terminal, a product to the customer, wherein the offered product is determined by the point-of-sale terminal based on the indication of the set of products, and wherein the offer is for the purchase of a unit of the offered product at a price that is less than a retail price that the unit of the product may otherwise be purchased for at a vending machine;

receiving, via the point-of-sale terminal, an indication of an acceptance of the offer;

providing, via the point-of-sale terminal, a voucher comprising an indication of the accepted product;

receiving, via the vending machine, the voucher;

determining, via the vending machine and based on the indication of the product from the voucher, the product; and dispensing, via the vending machine, a unit of the product.

3. The method of claim 2, wherein the offered and accepted product comprises a category of products defined by a plurality of products, the indication of the product by the voucher comprises an indication of the plurality of products, and the determining of the product by the vending machine comprises a determination of the plurality of products, further comprising:

receiving, by the vending machine, an indication of a selection of one of the plurality of products, wherein the unit of the product dispensed comprises a unit of the selected one of the plurality of products.

4. The method of claim 3, wherein the voucher comprises a token that visually indicates the category of products.

5. The method of claim 2, wherein the offered product is determined based at least in part on a perishability of the offered product.

6. The method of claim 2, wherein the voucher comprises a redemption voucher.

7. A method, comprising:

facilitating, at a point-of-sale terminal that is not a vending machine, a purchase of a first product by a customer;

providing, in response to the purchase of the first product by the customer and via the point-of-sale terminal, a customer feedback card;

receiving the customer feedback card at a vending machine;

determining, after the receiving and by the vending machine, that one or more questions presented on the customer feedback card have been answered;

determining, by the vending machine, a second product associated with the customer feedback card; and dispensing, by the vending machine, the determined second product to the customer.

8. The method of claim 7, wherein the second product comprises a free unit of the second product that is normally offered for sale via the vending machine.

* * * * *